(12) United States Patent
Kapur et al.

(10) Patent No.: US 11,151,575 B2
(45) Date of Patent: Oct. 19, 2021

(54) TRUSTED PAIR AUTHENTICATION WITH EDGE-COMPUTING DEVICES

(71) Applicant: Bank of America Corporation, Charlotte, NC (US)

(72) Inventors: Monika Kapur, Jacksonville, FL (US); Kevin A. Delson, Woodland Hills, CA (US); Brandon Sloane, Charlotte, NC (US); Siten Sanghvi, Jersey City, NJ (US); Albena N. Fairchild, Indian Trail, NC (US); John Ryan Bowling, Mooresville, NC (US)

(73) Assignee: Bank of America Corporation, Charlotte, NC (US)

( * ) Notice: Subject to any disclaimer, the term of this patent is extended or adjusted under 35 U.S.C. 154(b) by 198 days.

(21) Appl. No.: 16/505,930

(22) Filed: Jul. 9, 2019

(65) Prior Publication Data
US 2021/0012340 A1    Jan. 14, 2021

(51) Int. Cl.
| G06Q 20/40 | (2012.01) |
| G06Q 20/24 | (2012.01) |
| G06Q 20/32 | (2012.01) |
| G06Q 20/20 | (2012.01) |

(52) U.S. Cl.
CPC ......... *G06Q 20/409* (2013.01); *G06Q 20/202* (2013.01); *G06Q 20/24* (2013.01); *G06Q 20/322* (2013.01); *G06Q 20/4037* (2013.01)

(58) Field of Classification Search
CPC .... G06Q 20/409; G06Q 20/202; G06Q 20/24; G06Q 20/322; G06Q 20/4037
See application file for complete search history.

(56) References Cited

U.S. PATENT DOCUMENTS

| 7,539,856 B2 | 5/2009 | Buch et al. |
| 8,243,596 B2 | 8/2012 | Fedders et al. |
| 8,244,874 B1 | 8/2012 | Thireault |

(Continued)

OTHER PUBLICATIONS

Ceipidor, Ugo Biader, et al. "KerNeeS: A protocol for mutual authentication between NFC phones and POS terminals for secure payment transactions." 2012 9th International ISC Conference on Information Security and Cryptology. IEEE, 2012. (Year: 2012).*

(Continued)

*Primary Examiner* — Asfand M Sheikh
(74) *Attorney, Agent, or Firm* — Weiss & Arons LLP; Michael A. Springs, Esq.

(57) ABSTRACT

Apparatus and methods are provided for executing a rules-based authentication of an electronic transaction. The method may include receiving first and second payment authorization parameters and second payment authorization parameters. The method may also include receiving from a Point of Sale device a request for payment information and a purchase amount. The method may also include, determining if first or second parameters are satisfied. The first parameters may include a first time range, a pairing of the electronic device to a first apparatus, a first geolocation of the electronic device, and a first maximum transaction value. The second parameters may include a second time range, a pairing of the electronic device to a second apparatus, a second geolocation of the electronic device, and a second maximum transaction value, wherein the second time range does not include the first time range.

4 Claims, 6 Drawing Sheets

(56) References Cited

U.S. PATENT DOCUMENTS

| | | | | |
|---|---|---|---|---|
| 8,712,892 | B2* | 4/2014 | Dixon | G06Q 20/40 705/35 |
| 9,741,035 | B1* | 8/2017 | White | G06Q 20/405 |
| 9,900,725 | B2 | 2/2018 | Young et al. | |
| 10,104,672 | B2 | 10/2018 | Shah | |
| 10,311,439 | B2* | 6/2019 | Jajara | G06Q 20/4016 |
| 10,366,378 | B1* | 7/2019 | Han | G06Q 20/202 |
| 10,496,979 | B2* | 12/2019 | Taveau | G06Q 20/3278 |
| 2009/0127332 | A1* | 5/2009 | Park | G06Q 20/322 235/380 |
| 2011/0029437 | A1* | 2/2011 | Lee | G06Q 20/3223 705/72 |
| 2011/0112918 | A1* | 5/2011 | Mestre | G06Q 20/349 705/16 |
| 2011/0251910 | A1* | 10/2011 | Dimmick | G06Q 20/322 705/17 |
| 2012/0284130 | A1* | 11/2012 | Lewis | G06Q 40/00 705/16 |
| 2013/0103523 | A1* | 4/2013 | Okonkwo | G07F 7/125 705/26.1 |
| 2013/0151405 | A1* | 6/2013 | Head | G06Q 20/32 705/41 |
| 2013/0179281 | A1* | 7/2013 | White | G06Q 20/20 705/21 |
| 2013/0179352 | A1* | 7/2013 | Dwyre | G06Q 20/327 705/71 |
| 2013/0185214 | A1* | 7/2013 | Azen | G06Q 20/3272 705/76 |
| 2013/0282581 | A1* | 10/2013 | Singh | G06Q 20/322 705/44 |
| 2014/0006194 | A1* | 1/2014 | Xie | G06Q 20/102 705/21 |
| 2014/0372300 | A1* | 12/2014 | Blythe | G06Q 20/3676 705/41 |
| 2015/0088730 | A1* | 3/2015 | Counts | G06Q 20/34 705/39 |
| 2015/0278795 | A1* | 10/2015 | Jiang | G06Q 20/3829 705/44 |
| 2016/0078445 | A1* | 3/2016 | Einhorn | G06Q 20/4014 705/21 |
| 2016/0110706 | A1* | 4/2016 | Li | G06Q 20/3229 705/44 |
| 2017/0032370 | A1* | 2/2017 | Beltramino | G06Q 20/38215 |
| 2018/0121891 | A1 | 5/2018 | Hosny et al. | |
| 2018/0167445 | A1 | 6/2018 | Speight et al. | |
| 2018/0276655 | A1* | 9/2018 | Sawant | G06Q 20/3278 |
| 2018/0276666 | A1* | 9/2018 | Haldenby | G06Q 20/20 |
| 2018/0367314 | A1 | 12/2018 | Egner et al. | |
| 2019/0020657 | A1 | 1/2019 | Egner et al. | |
| 2019/0026450 | A1 | 1/2019 | Egner et al. | |
| 2020/0250644 | A1* | 8/2020 | Oberholtzer | G06Q 20/027 |
| 2020/0394646 | A1* | 12/2020 | Beye | G06Q 20/3224 |

OTHER PUBLICATIONS

Kayande, Deepali, et al. "Overview of a payment solution for NFC-Enabled Mobile phones." 2016 International Conference on ICT in Business Industry & Government (ICTBIG). IEEE, 2016. (Year: 2016).*

Mary Shacklett, "Edge Computing: A Cheat Sheet," https://www.techrepublic.com/article/edge-computing-the-smart-persons-guide/, Jul. 21, 2017.

Paul Miller, "What is Edge Computing?" https://www.theverge.com/circuitbreaker/2018/5/7/17327384/edge-computing-cloud-google, May 7, 2018.

"What is Edge Computing," https://www.ge.com/digital/blog/what-edge-computing, GE Digital, Retrieved on May 16, 2019.

* cited by examiner

TRUSTED PAIR AUTHENTICATION WITH EDGE-COMPUTING DEVICES

FIELD OF TECHNOLOGY

Aspects of the disclosure relate to authorizing a credit card payment. Additionally, aspects of the disclosure relate to providing enhanced security settings for credit card payments.

BACKGROUND

Typical credit card transactions are processed using an internet or telephone connection. When a customer desires to make a purchase, a merchant captures the customer's credit card information at a point of sale terminal ("POS") and sends it over an internet or telephone connection to an acquiring bank. The acquiring bank then forwards the information over a credit card network to an issuing bank for processing. Because these methods rely on an external communications network the POS is unable to process credit card transactions when the external network is down. This can be a source of frustration for both the customer and the merchant, interrupting sales until connection has been reestablished.

It would be desirable, therefore, to provide systems and methods for approving a credit card transaction at a POS without having to send data over an external communications network such as the internet or a telephone line.

Credit cards are widely utilized payment instruments that customers use to pay for goods and services. Authorizing a credit card transaction with a credit card is a simple process, requiring only insertion of the credit card into a POS and then scribbling a signature onto a screen. Unfortunately, the credit card's ease of use has made it simple for an unauthorized user to complete a purchase using the card.

Today, many people have one or more of a smart phone, smart watch, or other electronic device on their person at all times. It would be desirable, therefore, to provide systems and methods for enhancing a credit card's security by requiring, as a precondition for payment authorization, a pairing of the credit card to one or more of the credit card owner's electronic devices.

SUMMARY OF THE DISCLOSURE

Apparatus and methods are provided for approving a credit card transaction at a Point of Sale device. The transaction may be approved without sending payment information to an acquiring bank, to be forwarded, over a credit card network, to an issuing bank. The approval of the transaction may be performed by a Point of Sale device ("POS") temporarily disconnected from the internet and an edge computing device. The edge computing device may or may not have internet connection at the time of the approval of the transaction.

The methods may include the POS receiving credit card information from a customer's credit card. The information may be provided by the customer to the POS to complete a transaction for a purchase amount. The methods may include the POS determining that the POS does not have internet connection. The methods may include the POS generating a near-field communications request at the POS to connect to an edge device. The methods may include the POS receiving from the edge device a data packet, the data packet identifying at least a portion of the credit card information. The methods may include the POS determining that the data packet correctly identifies the at least a portion of the credit card information. The methods may include the POS transmitting to the edge device a purchase amount.

The methods may include the edge device accessing stored information associated with the credit card. The stored information may include an available credit. The methods may include the edge device determining if the purchase amount is less than a predetermined percentage of the available credit. In response to determining that the purchase amount is less than the predetermined percentage of the available credit, the methods may include the edge device transmitting to the POS an instruction to approve the transaction.

The methods may include the POS approving the transaction. The methods may include the POS storing transaction information in a database. The methods may include, upon a determination that the internet connection has been reestablished, the POS transmitting the transaction details to an authorizing bank.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
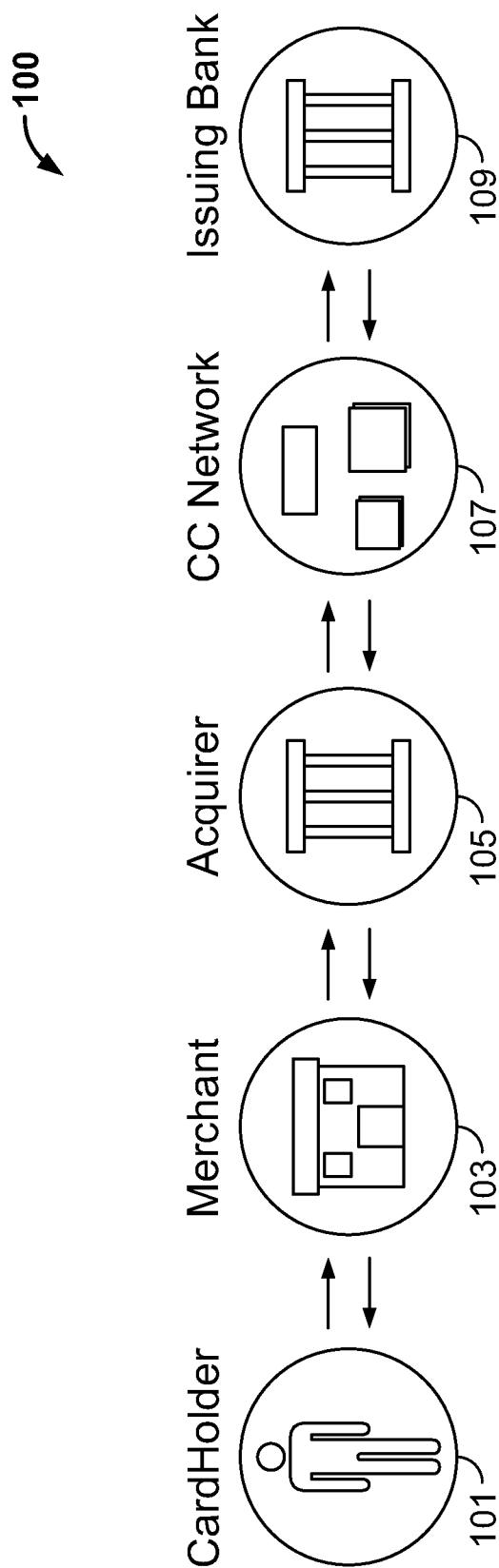
FIG. 1 shows a method associated with the prior art.

Apparatus and methods for approving a transaction at a POS are provided. The methods may be performed by a POS and an edge device. The transaction is described herein as being a credit card transaction. The transaction may, instead, be a debit transaction or any other suitable electronic transfer of funds. The methods may be computer-implemented methods.

The transaction may be approved without the POS sending payment information to an acquiring bank for approval of the transaction. At the time of the approval of the transaction the POS may not have an internet connection or a phone line connection. At the time of the approval of the transaction, the edge device may not have an internet connection. Alternatively, one or both of the POS and the edge device may have an internet connection or phone connection at the time of the approval of the transaction. The edge device may be a mobile phone or any other suitable electronic device.

The methods may be performed using a communications network that establishes communication between the POS and the mobile phone. The communications network may be a wireless communications network. The communications network may support any suitable wireless communications protocol. Exemplary protocols include NFC, Bluetooth, Wi-Fi, LTE, or any other suitable communication protocols.

The mobile phone may store credit card information relating to one, two or more credit cards. The credit cards may be credit cards owned by the mobile phone's user. The credit cards may be credit cards on which the mobile phone's user is an authorized user.

In some embodiments, the mobile phone, when connected to the internet, may continuously pull from an online credit card platform information associated with the credit card(s). The mobile phone may pull the data upon the lapse of a predetermined time period, such as every five minutes, ten minutes, one hour, or any other suitable time period. The credit card information may include an available credit remaining on the credit card, authorized users of the card, and any other suitable credit card information.

In embodiments when the transaction is a debit transaction, the mobile phone may pull from a banking platform an available balance in a bank account from which the debit transaction would be debited.

In some embodiments, the mobile phone, when connected to the internet, may receive, from a credit card online platform, information associated with a credit card. The credit card platform may push the data to the mobile phone upon the lapse of a predetermined time period, such as every five minutes, ten minutes, one hour, or any other suitable time period. The credit card platform may push data to the mobile phone each time there is a change in the credit card's information, such as each time there is a change in the credit available on the credit card. For example, each time the customer makes a purchase with the credit card, a fee is charged to the credit card, or a payment is made against a balance on the credit card, the credit card online platform may push to the mobile phone data detailing the modified credit available on the credit card. The credit card information may include an available credit remaining on the credit card, authorized users of the card, and any other suitable credit card information.

In some embodiments, the methods may be performed while the mobile phone has internet connection. In some of these embodiments, the mobile phone may either determine whether or not to authenticate a credit card transaction, either by accessing data stored on the mobile phone as described below or by pulling or requesting data from the credit card online platform. In some of these embodiments, if the transaction is more than a predetermined amount, or if other pre-set conditions are met, the mobile phone may deny authenticating the card using mobile phone data and instead transmit to the credit card online platform transaction data and ask the credit card platform to approve or deny the transaction.

In some embodiments, the methods may be performed while the POS has one or both of an internet connection and/or a telephone line connection. In some of these embodiments, the POS may first determine if a mobile phone is available to process the transaction as detailed below before sending data to a merchant bank. If a mobile phone is available, the POS may then request the mobile phone to authenticate or deny the transaction as described below. If a mobile phone is unavailable to process the transaction, the POS may then use the internet or telephone line connection to process the transaction.

The methods may include the POS receiving credit card information from a customer. The POS may receive the information when a customer swipes his credit card at the POS, or presents a payment instrument in communication with the POS. The credit card information may be provided by the customer to the POS to complete a transaction for a purchase amount.

In some embodiments, the methods may include the POS determining that the POS does not have an internet connection or a telephone line connection.

The methods may include the POS generating a request to connect to an edge device. The request may be a wireless request. The request may be transmitted over a communications network. The request may use a communications protocol such NFC, Bluetooth, Wi-Fi, LTE, or any other suitable communication protocol. The edge device may be a mobile phone, smart watch, laptop, or any other suitable electronic device. The edge device may be referred to herein as a mobile phone, but it is to be understood that this is for exemplary purposes only and any electronic device different from a mobile phone may be used.

The methods may include receiving from the mobile phone a data packet. In some embodiments, the data packet may identify at least a portion of the credit card information. In other embodiments, the data packet may include a security code, an encrypted message, an authorization code, or any other suitable information that informs that POS that the edge device is approved to authorize a payment on behalf of the credit card.

The methods may include determining that the data packet correctly identifies the at least a portion of the credit card information. In the embodiments when the data packet includes information different from credit card information, the methods may include determining that the received data packet authorizes the edge device to authorize a payment on behalf of the credit card.

The methods may include transmitting to the mobile phone a purchase amount for approval by the mobile phone.

The methods may include the mobile phone accessing stored information associated with the credit card. The stored information may be pushed or pulled from an online credit card platform as described above. The stored information may include an amount of credit available on the credit card.

In some of the embodiments when the mobile phone has internet connection, the stored information may be stored on the internet and the mobile phone may access the stored information, such as the available credit, using the internet connection. The stored information may be stored on the online credit card platform. The mobile phone may then use the decisioning process detailed below to determine whether or not to authenticate the transaction. Alternately, in some of these embodiments, the mobile phone may transmit the purchase amount to the online credit card platform associated with the credit card and authenticate or deny the transaction based on instructions received from the online credit card platform.

In the embodiments when the mobile phone is not connected to the internet, the stored information may be stored on the mobile phone. In these embodiments the accessing of the stored information may not be performed through an internet connection.

In some embodiments, if the mobile phone determines that an available credit on the credit card covers the purchase amount, the mobile phone may transmit a message to the POS to authenticate the transaction.

In other embodiments, the mobile phone may first determine if the purchase amount or transaction details satisfy one or more metrics. If the purchase amount or transaction details satisfy the one or more metrics, the mobile phone may then transmit a message to the POS to authenticate the transaction. If the purchase amount of the transaction details does not satisfy the one or more metrics, the mobile phone may transmit a message to the POS to deny the transaction.

Exemplary metrics, detailed below, may include one or more of whether or not the purchase amount is less than a predetermined percentage of the credit card's available credit, whether or not a lapse of time since the mobile phone's loss of internet connection is less than a threshold lapse of time, whether or not an expected time for reestablishing internet connection is less than a threshold time, whether or not the mobile phone is paired or is in electronic communication with an electronic device, and/or any other suitable metrics.

In some embodiments, the methods may include the mobile phone determining if the purchase amount is less than a predetermined percentage of the available credit. In response to determining that the purchase amount is less than the predetermined percentage of the available credit, the methods may include transmitting to the POS an instruction to approve the transaction. In response to determine that the purchase amount is greater than the predetermined percentage of the available credit, the methods may include transmitting to the POS an instruction to deny the transaction.

The mobile phone may determine whether or not the transaction or transaction details satisfy the one or more metrics before accessing the transaction information or after accessing the transaction information.

The mobile phone may store a metric that the mobile phone can only authenticate a transaction that has a value that is no more than 10%, 20%, 30%, 40%, 50%, 60%, 70%, 80% or 90% of the available credit that is stored on the mobile phone.

The mobile phone may store a metric that the mobile phone, when offline, can only authenticate a transaction that has a value that is no more than 10%, 20%, 30%, 40%, 50%, 60%, 70%, 80% or 90% of the available credit that is stored on the mobile phone.

The mobile phone may store a metric that, when the mobile phone is online and can communicate with the online credit card platform, the mobile phone can authenticate a transaction that has a value that is no more than 10%, 20%, 30%, 40%, 50%, 60%, 70%, 80%, 90% or 100% of the available credit that is stored on the mobile phone.

In some embodiments, the credit card may have an account holder and one, two or more authorized users. In some embodiments, each of the account holder and the one, two or more authorized users may have a different stored metric. For example, the account holder may be able to use 70% of the available credit, first authorized user may be able to use 30% of the available credit and a second authorized user may be able to use 25% of the available credit. In some embodiments, the mobile phone may determine who is attempting to authorize the purchase by requesting for input of biometrics on the mobile phone or a facial scan before authorizing the purchase. In some embodiments, two or more mobile phones may be configured to execute the methods detailed herein, each mobile phone being associated with one of the account holder or the authorized user(s). Each mobile phone may then store a metric of an available purchase amount based on the identity of the user associated with the mobile phone.

The metric may be a first metric. The mobile phone may store a second metric that may further restrict the available credit stored on the mobile phone.

The mobile phone may first determine the available credit based on the metric detailed above. The mobile phone may then determine an identify of a user who is using the mobile phone using biometrics, a facial scan, or any other suitable method. In the event that the mobile phone determines that the account holder is attempting to complete the purchase, the mobile phone may determine that the available credit based on the first metric as detailed above. In the event that the mobile phone determines that an authorized user is attempting to complete the purchase, the mobile phone further reduce the credit available after applying the first metric by applying a second metric to the available credit. The second metric may be 10%, 20%, 30%, 40%, 50%, 60%, 70%, 80%, 90%. Thus, the account holder may be allowed to use a percentage of an amount of funds available for use by the account owner. For example, the account holder may be allowed to use up to 50% of the available credit and the authorized user may be allowed to use 40% of the credit that is available to the account holder.

In the embodiments when the mobile phone does not have internet connection, the methods may include the mobile phone calculating a lapse of time from when the mobile phone lost internet connection until the receipt of the communication request from the POS. The mobile phone may calculate the lapse of time prior to the accessing of the stored credit card information or after the accessing of the stored credit card information.

The methods may include the mobile phone determining if the lapse of time is greater than a threshold lapse of time. If the lapse of time is greater than the threshold lapse of time, the mobile phone may transmit an instruction to the POS to deny the transaction. If the lapse of time is less than the threshold lapse of time, the mobile phone may proceed to access the stored credit card information.

In the embodiments when the mobile phone does not have internet connection, the methods may include the mobile phone determining a geolocation of the mobile phone immediately prior to the mobile phone losing internet connection. The mobile phone may determine the geolocation prior to the accessing of the stored credit card information.

The mobile phone may determine an expected time when the internet connection will be reestablished based on the geolocation prior to losing internet connection and a current geolocation. If the expected time is greater than a threshold time, the mobile phone may transmit a message to the POS to deny the transaction. If the expected time is less than the threshold time, the mobile phone may proceed to access the stored credit card information.

For example, the mobile phone may determine that the mobile phone was in a tunnel prior to losing internet connection and that the mobile phone is now half-way through the tunnel. The mobile phone may then determine that internet connection may be reestablished in about 5-10 minutes. This time span may be below the threshold time.

The methods may include the mobile phone determining if the mobile phone is in communication with an electronic device. If the mobile phone is not in communication with the electronic device, the mobile phone may transmit a message to the POS to decline the transaction. The communication may use any suitable communication network, and may use any suitable communication protocols such as near-field communication, Wi-Fi or Bluetooth. The electronic device may be a watch, a band, a laptop, or any other suitable electronic device that supports wireless communication capabilities. The methods may include the mobile phone determining if first or second payment parameters as satisfied (as detailed below in regards to pairing a mobile phone with two electronic devices). If the parameters are not satisfied, the methods may include transmitting an instruction to the POS to deny the transaction.

The methods may include the POS approving the transaction. The POS may approve the transaction upon receipt of an instruction from the mobile phone to approve the transaction.

After the transaction has been approved, the methods may include the POS transmitting a message to the mobile phone reporting that the transaction has been approved. The methods may include the mobile phone receiving, from the POS, the message indicating that the transaction has been approved. The methods may include the mobile phone decreasing the stored available credit of the credit card. The mobile phone may decrease the stored available credit by the purchase amount.

In some embodiments, after approval of the transaction by the POS, the POS may store the credit card information and the purchase amount in a database. The database may be a database that stores temporary data. The POS may store this information in an encrypted format. Upon a determination, by the POS, that the POS's internet connection or the telephone line has been reestablished, the methods may include the POS transmitting to a merchant bank a request for payment. The request for payment may include the stored credit card information, the purchase amount and information indicating that the purchase has already been approved. The merchant bank may then transmit the information to an issuing bank for payment. Upon receipt of a communication indicating that the purchase has been approved, the stored credit card information and purchase amount may be wiped from the database.

In some embodiments, after approval of the transaction by the POS, the methods may include the mobile phone storing in a secure database the credit card information, the purchase amount, and merchant information that identifies the merchant that supports the POS. The database may be a secure transaction wallet. The POS may transmit to the mobile phone merchant information that identifies the merchant. Upon a determination that the internet connection has been reestablished, the mobile phone may transmit the stored credit card information, purchase amount, and merchant information to a bank for processing. After the data has been transmitted, the mobile phone may wipe the stored data from the secure database.

The mobile phone may securely transmit the information to an acquiring bank of the merchant. The mobile phone may securely transmit the information to an issuing bank. The issuing bank may be a bank that issued the credit card. In some of these embodiments, the mobile phone may securely transmit to the issuing bank an instruction to transfer to the merchant's acquiring bank the purchase amount less a relevant fee such as a credit card network processing fee.

The methods may include a credit card platform performing the method steps of determining that the mobile phone has lost internet connection and putting on hold, for the credit card, the predetermined percentage of available credit. This may ensure that any credit used by the credit card while the card is offline will not exceed a total available credit on the credit card. For example, when the mobile phone goes offline, the credit card platform may place a hold on 20% of the available credit on the credit card. The mobile phone, while offline, may be restricted to authenticating a transaction that is no more than 20% of the available credit on the credit card. The credit card platform may release the hold once the mobile phone regains internet connection and, in some embodiments, the mobile phone transmits data to the credit card platform detailing transactions, or the lack of any transactions, that the mobile phone has authorized while the mobile phone was offline.

The mobile phone may keep an up to date record of additional data, such as the mobile phone user's online banking data, including account balances. This may enable a customer to transfer money between accounts while the phone is offline and, when the phone comes back online, the phone may transfer to a financial institution platform the data detailing the transfer of money between the two specified accounts. If funds are available to execute the transfer, the financial institution may execute the transfer.

The mobile phone may also store information relating to stock prices. In some embodiments, the mobile phone, when it goes offline, may allow a customer to execute a purchase of a stock based on the last updated value of the stock prior to the phone going offline and based on the stored customer bank account data. The last updated value of the stock may be inclusive of a risk-based charge. The risk-based charge may represent a volatility risk to the financial institution approving the purchase. The risk-based charge may be used by the financial institution to offset the financial institution's market and volatility risk in approving the purchase. In some of these embodiments, the mobile phone may only allow the purchase to be authenticated if one or more of the metrics detailed above have been satisfied, such as time offline, expected time to regain internet access, etc.

When the mobile phone goes back online, the mobile phone may transmit to a central server the stock purchase information. The central server may then purchase the stock on behalf of the customer. The central server may charge to the customer the price of the stock that was the last updated value of the stock prior to the phone going offline, in addition to, in some embodiments, the risk-based charge. The central sever may charge to the customer the stock's price at the time that the central server purchases or authorizes the purchase of the stock The systems and methods of the invention may be used to approve a typically online transaction when an electronic device, such as a mobile phone, computer, etc., is offline. In these embodiments, the electronic device may have approved one or more times a scheduled online transaction. A user may be presented with the opportunity, while the electronic device is offline, to authorize the scheduled transaction in an offline mode. The electronic device may store the authorization regarding the scheduled transaction and, when the internet connection is regained, forward the information to the suitable online platform for purchase processing.

The systems and methods of the invention may also be used in the event that a customer attempts to execute a purchase during a natural disaster when the customer's electronic device is offline. The electronic device (such as a mobile phone) may have stored available credit information and/or bank account balance information as detailed above. If a purchase amount is within the minimum purchase amount/available balance amount allowed or selected by the customer to be allowed when the device is offline, then, the device may be used to approve a transaction as detailed above and update the remaining available credit/balance in the device. Once the electronic device has regained access to the internet, the electronic device may transmit a message to a credit card issuing bank or the customer's financial institution to process the transaction and/or update an available balance.

The systems and methods of the invention detailed herein may be used both for purchases when the electronic device has internet connection and when the electronic device does not have internet connection. The electronic device may support data transmissions to a main server and to a POS device during both the online and offline modes.

The systems and methods of the invention may include methods for executing a rules-based authentication of an electronic transaction. The methods may be implemented on a computer. The methods may be performed by an electronic device supporting communication, which may be wireless communication, and payment transaction capabilities.

The electronic device may be a mobile phone, a watch, an iPad, a laptop, a payment instrument, or any other suitable device. The mobile phone may include a mobile wallet.

The methods may include receiving first payment authorization parameters and second payment authorization parameters from a user. The parameters may be input into the electronic device by the user. The parameters may be transmitted to the electronic device from a platform such as a banking platform. The user may input the parameters into the banking platform.

The first payment authorization parameters may include one or more of a first time range, a pairing of the electronic device to a first apparatus or the electronic device being in electronic communication with a first apparatus, a first geolocation of the electronic device, and a first maximum transaction value. The electronic communication may use any suitable electronic communication protocol such as NFC, LTE, RFID, Bluetooth, or any other suitable protocol. The transaction value may be the purchase amount.

The second payment authorization parameters may include one or more of a second time range, a pairing of the electronic device to a second apparatus or the electronic device being in electronic communication with the second apparatus, a second geolocation of the electronic device, and a second maximum transaction value. The second time range may not include the first time range.

The first and second apparatus may be one of a mobile phone, watch, band, laptop, iPad, or any other suitable electronic device.

The methods may include receiving from a POS a request for payment information and a purchase amount. The POS may transmit the request to the electronic device using a communication protocol such as a protocol detailed above.

The methods may include the electronic device determining if the time of day is within the first time range. If the time of day is within the first time range, the methods may include the electronic device determining if the first parameters are satisfied. If the electronic device determines that the first parameters are satisfied, the methods may include the electronic device transmitting to the POS payment information. Payment information may include information identifying a credit card and any other information that the POS needs to send to the merchant bank to authorize the transaction. If the electronic device determines that the first parameters are not satisfied, the methods may include the electronic device transmitting a message to the POS denying the transaction.

The methods may include the electronic device determining if the time of day is within the second time range. If the time of day is within the second time range, the methods may include the electronic device determining if the second parameters are satisfied. If the electronic device determines that the second parameters are satisfied, the methods may include the electronic device transmitting to the POS the payment information. If the electronic device determines that the second parameters are not satisfied, the methods may include the electronic device transmitting a message to the POS denying the transaction.

The methods may include the electronic device determining that the time of day is neither within the first or second time range. In response to this determination, the electronic device may transmit to the POS the payment information.

The electronic device may be paired to the first apparatus using a wireless communication protocol. The electronic device may be paired to the second apparatus using a wireless communication protocol.

The methods may include the electronic device receiving third payment authorization parameters from the user. The third payment authorization parameters may include one or more of a third time range, a pairing of the electronic device to a third apparatus or the electronic device being in communication with the third apparatus, a third geolocation of the electronic device, and a third maximum transaction value. The third time range may not include the first time range or the second time range.

The methods may include triggering an alert when the electronic device is no longer paired to one or both of the first of second devices.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows exemplary method 100 performed in the prior art. In the prior art method, a card holder 101 provides Merchant 103 with credit card information. Merchant 103 sends the credit card information and a purchase amount to Merchant 103's acquiring bank 105. Acquiring bank 105 forwards the information to credit card network 107, and credit card network 107 sends the credit card information to issuing bank 109. Issuing bank 109 checks if a credit card identified by the credit card information has sufficient credit to cover the purchase amount. Issuing bank 109 then sends an instruction to approve or deny the transaction through credit card network 107 to acquiring bank 105. Acquiring bank 105 transmits the instruction back to merchant 103.

The exemplary methods performed in FIG. 1 are performed using one or more of telephone line or internet connections. Thus, if any of the telephone line or internet connections are down, the merchant is unable to complete card holder 101's purchase.

Figure 2:
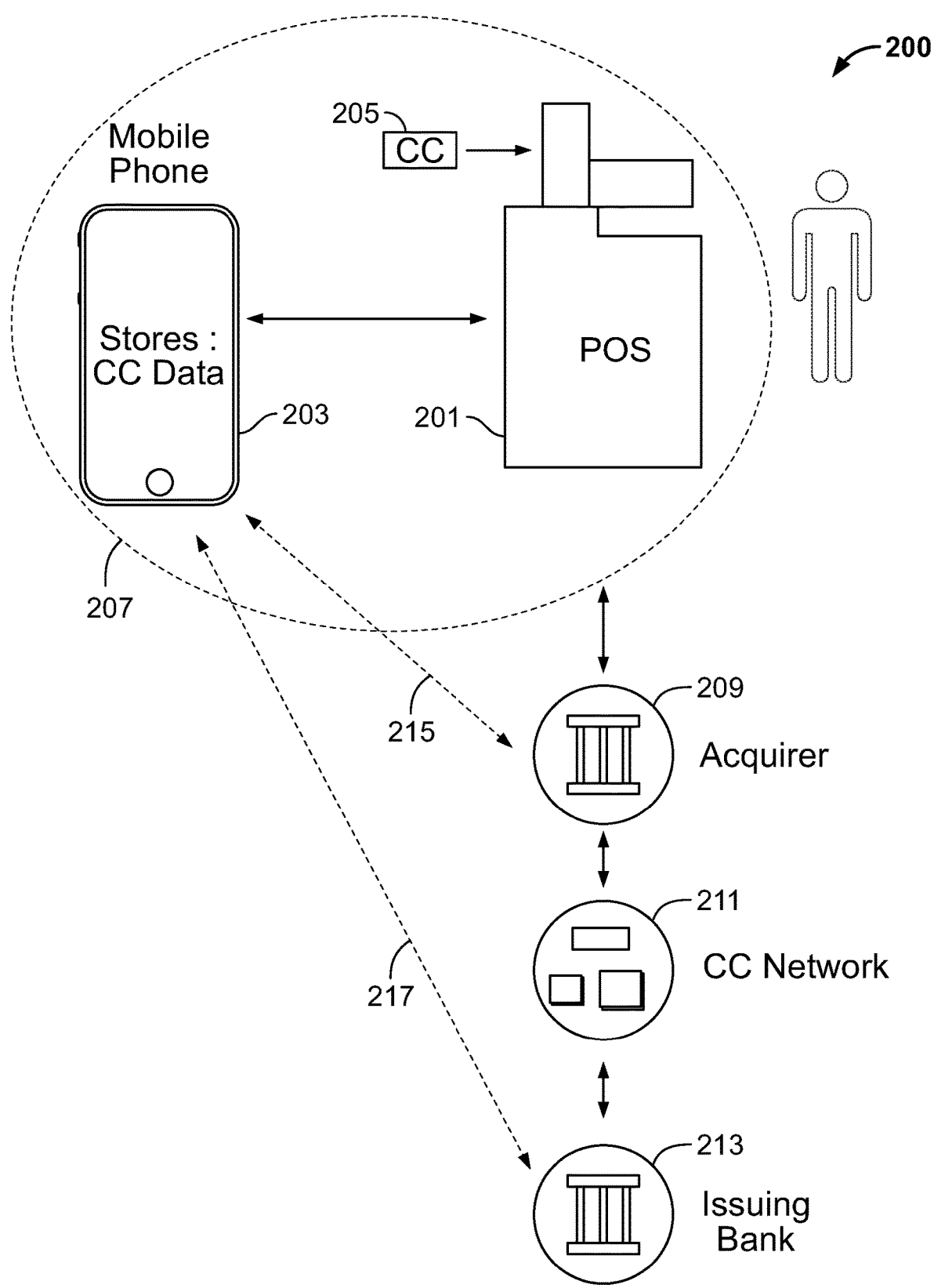
FIG. 2 shows exemplary apparatus and methods in accordance with the invention.

FIG. 2 shows exemplary apparatus and methods 200 in accordance with the invention. In FIG. 2, a customer has provided credit card information 205 to POS 201. POS 201 typically supports a telephone or internet connection with acquiring bank 209, which is in connection with issuing bank 213 via credit card network 211.

In FIG. 2, POS 201 has lost connection with acquiring bank 209. However, POS 201 has established communications with mobile phone 203. Communications illustrated within area 207 are communications that are supported without internet or telephone communication. For example, POS 201 may communicate with mobile phone 203 using NFC, Bluetooth, Wi-Fi, or any other suitable wireless communication protocol.

Mobile phone 203 may optionally be in communication with one or both of acquiring bank 209 and issuing bank 213. Mobile phone 203 may be in electronic communication with one or both of acquiring bank 209 and issuing bank 213 via an internet connection.

Mobile phone 203 may support communications with one or both of acquiring bank 209 and issuing bank 213 while mobile phone 203 authorizes a transaction based on credit card 203 at POS 201. Mobile phone 203 may not have an internet connection while mobile phone 203 authorizes a transaction based on credit card 203 at POS 201. Mobile phone may reestablish communications with one or both of acquiring bank 209 and issuing bank 213 at a later time after the authorization of the transaction.

Figure 3:
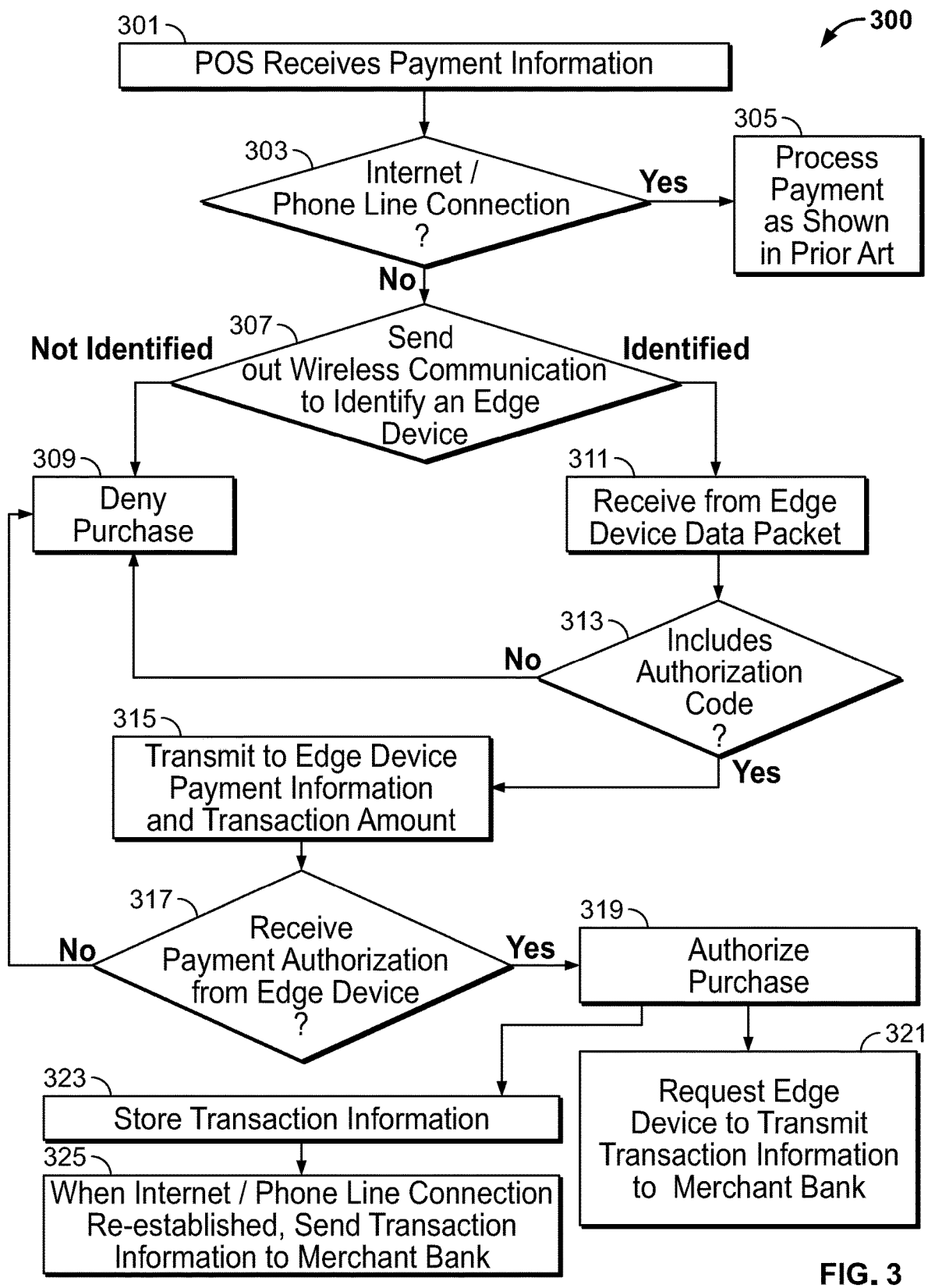
FIG. 3 shows an exemplary method in accordance with the invention.

FIG. 3 shows exemplary method 300 that may be performed in accordance with the invention. Method 300 may be a method performed by a POS. Method 300 may include some or all of the method steps 301-325. Method 300 may include additional method steps not described in FIG. 3 but disclosed herein.

At step 301, the POS may receive payment information. At step 303, the POS may determine if it has an internet or phone line connection. If the POS does have an internet/phone line connection, at step 305 the POS may process the payment as shown in the prior art (see FIG. 1). If the POS does not have an internet/phone line connection, at step 307 the POS may send out a communication to identify an edge computing device. The communication may be transmitted over a wireless communication network. If the POS does not identify an edge computer device, at step 309 the POS may deny a purchase for which the payment information was provided.

If the POS does identify an edge device, at step 311 the POS may receive a data packet from the edge device. At step 313 the POS may determine if the data packet includes an authorization code. The authorization code may identify some or all of the credit card information, a security key, an encrypted message that may need to be decoded using a hash value, or any other suitable authorization code. If the POS determines that the data packet does not include the authorization code, at step 309 the POS may deny the purchase.

If the POS determines that the data packet does include the authorization code, at step 315 the POS may transmit to the edge device the payment information and a purchase amount. If the POS does not receive payment authorization from the edge device, at step 309 the POS may deny the purchase. If the POS does receive payment authorization from the edge device, at step 319 the POS may authorize the purchase.

After authorizing the purchase, the POS may perform either step 321 or steps 323 and 325.

At step 321 the POS may request the edge device to transmit transaction information to a merchant or issuing bank.

At step 323 the POS may store the transaction information. At step 325, when an internet or phone line connection has been reestablished at the POS, the POS may send the stored transaction information to a merchant bank.

Figure 4:
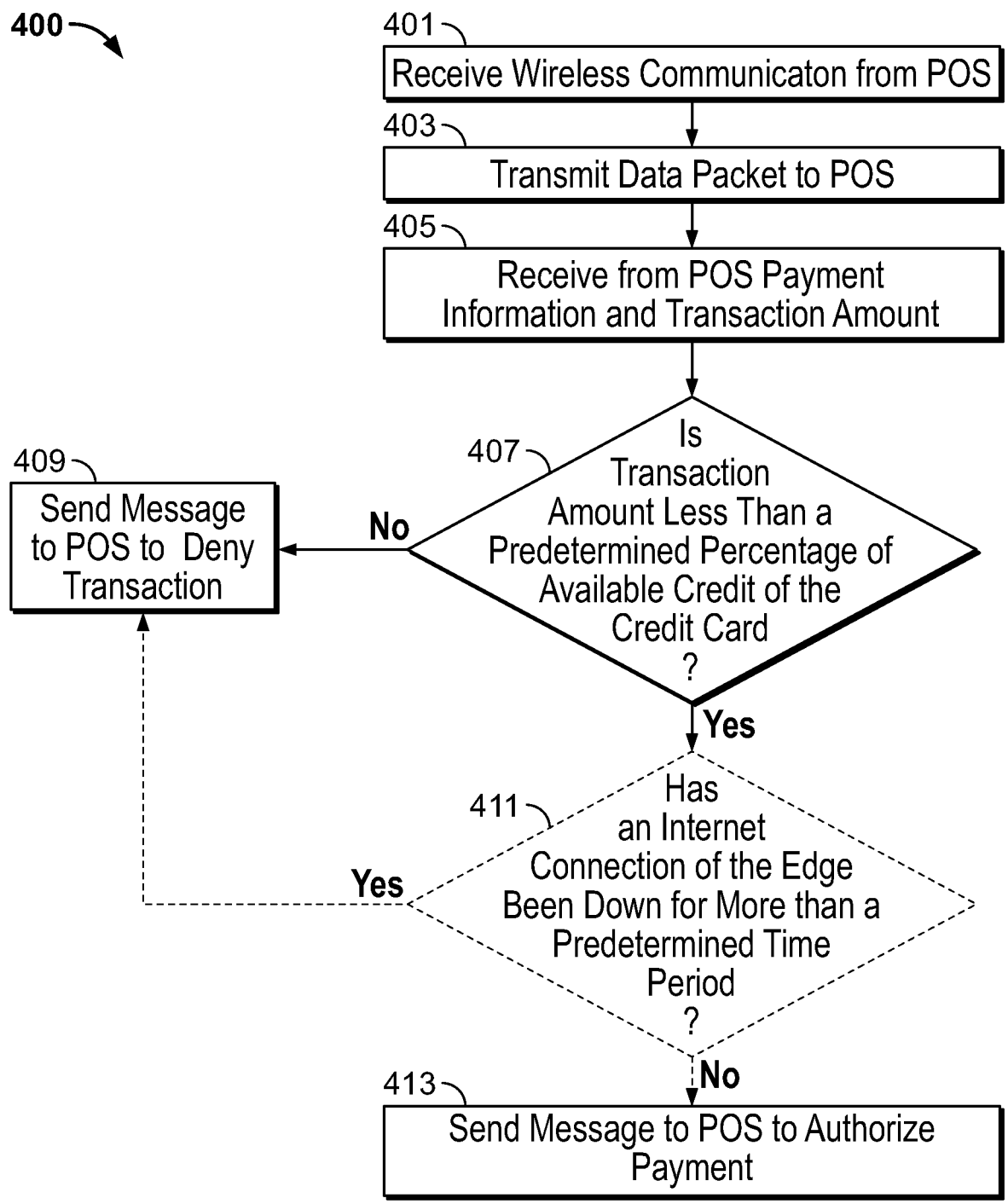
FIG. 4 shows an exemplary method in accordance with the invention.

FIG. 4 shows exemplary method 400 that may be performed in accordance with the invention. Method 400 may be a method performed by an edge device. Method 400 may include some or all of the method steps 401-415. Method 400 may include additional method steps not described in FIG. 4 but disclosed herein.

At step 401, the edge device may receive a communication from a POS (such as the POS discussed in FIG. 3 or herein). The communication may be received over a wireless communication network. At step 403, the edge device may transmit a data packet to the POS. The data packet may include an authorization code. The authorization code may verify, to the POS, that the edge device is an authorized device to be used, on behalf of the credit card, to validate a purchase using the credit card.

At step 405 the edge device may receive from the POS payment information and a transaction amount. The transaction amount may be the purchase amount. At step 407 the edge device may determine if the transaction amount is less than a predetermined percentage of available credit of the credit card. If the transaction amount is not less than the predetermined percentage, at step 409 the edge device may send a message to the POS to deny the transaction. If the transaction amount is less than the predetermined percentage, at optional step 411 the edge device may determine if an internet connection of the edge device has been down for more than a predetermined time period. If the internet connection has been down for more than the predetermined time period, at step 409 the edge device may send a message to the POS to deny the transaction.

If the internet connection has not been down for more than the predetermined time period, at step 413 the edge device may send a message to the POS to authorize the payment.

Figure 5:
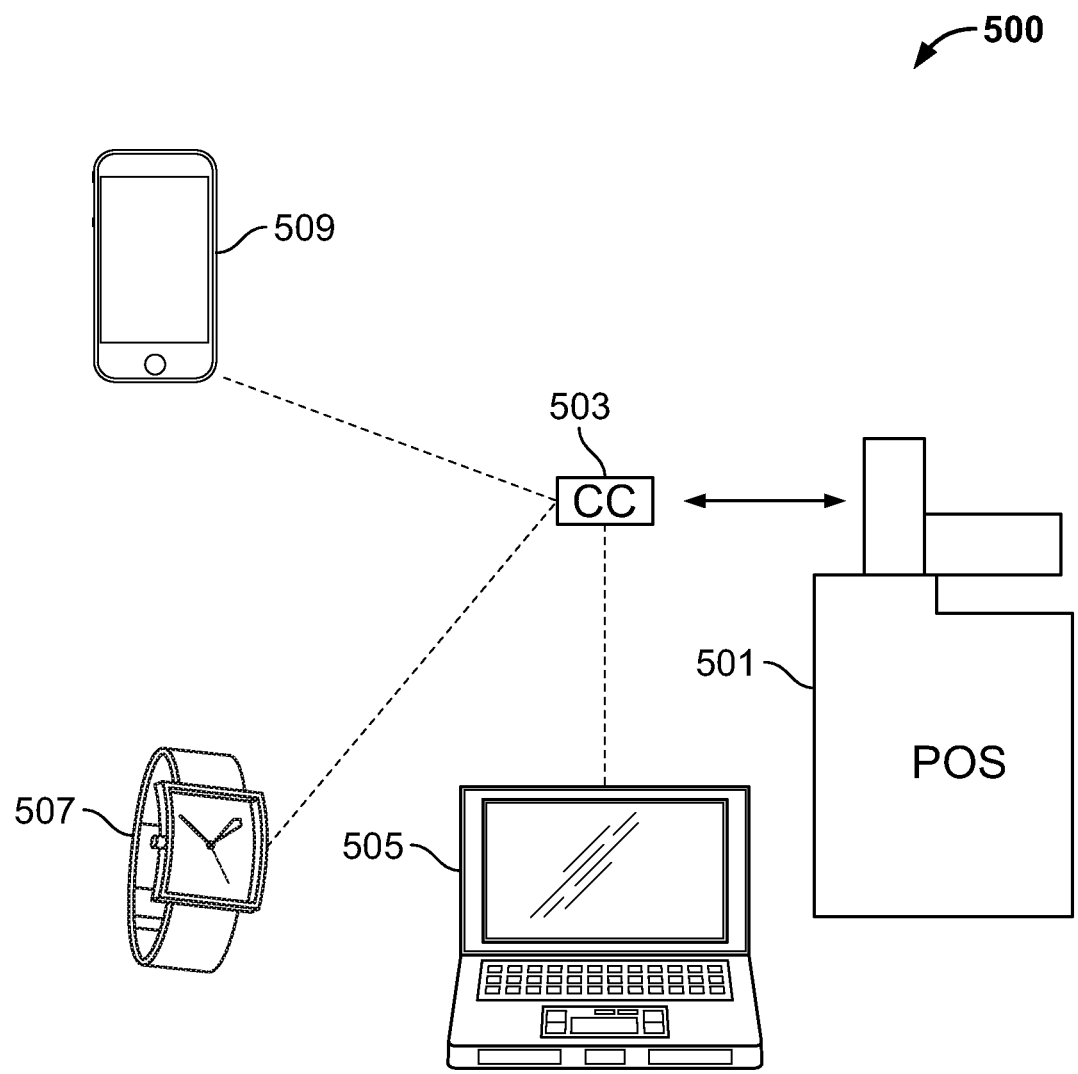
FIG. 5 shows exemplary apparatus and methods in accordance with the invention.

FIG. 5 shows exemplary apparatus 500 in accordance with the invention.

Exemplary apparatus may include POS 501, and credit card 503. Credit card 503 may be a mobile phone storing credit card information.

Credit card 503 may be in communication with one or more of mobile phone 509, watch 507 and laptop 505. The communication may be established over a wireless communications network. Credit card 503 may not transmit to POS 501 credit card information unless credit card 503 determines that it is in communication with one or more of mobile phone 509, watch 507 and laptop 505. The object(s) that credit card 503 must be in communication with in order transmit credit card information to POS 501 may be selected by a user of credit card 503. The user of credit card 503 may also select one or more of a time of day, geographical location, and purchase amount, and a pairing of the credit card/mobile phone to an electronic device, as described herein, to further restrict under what conditions credit card 503 may be used to execute a payment.

In other embodiments, CC 503 may be a mobile device, an iPad, a laptop, or any other suitable computing device.

Figure 6:
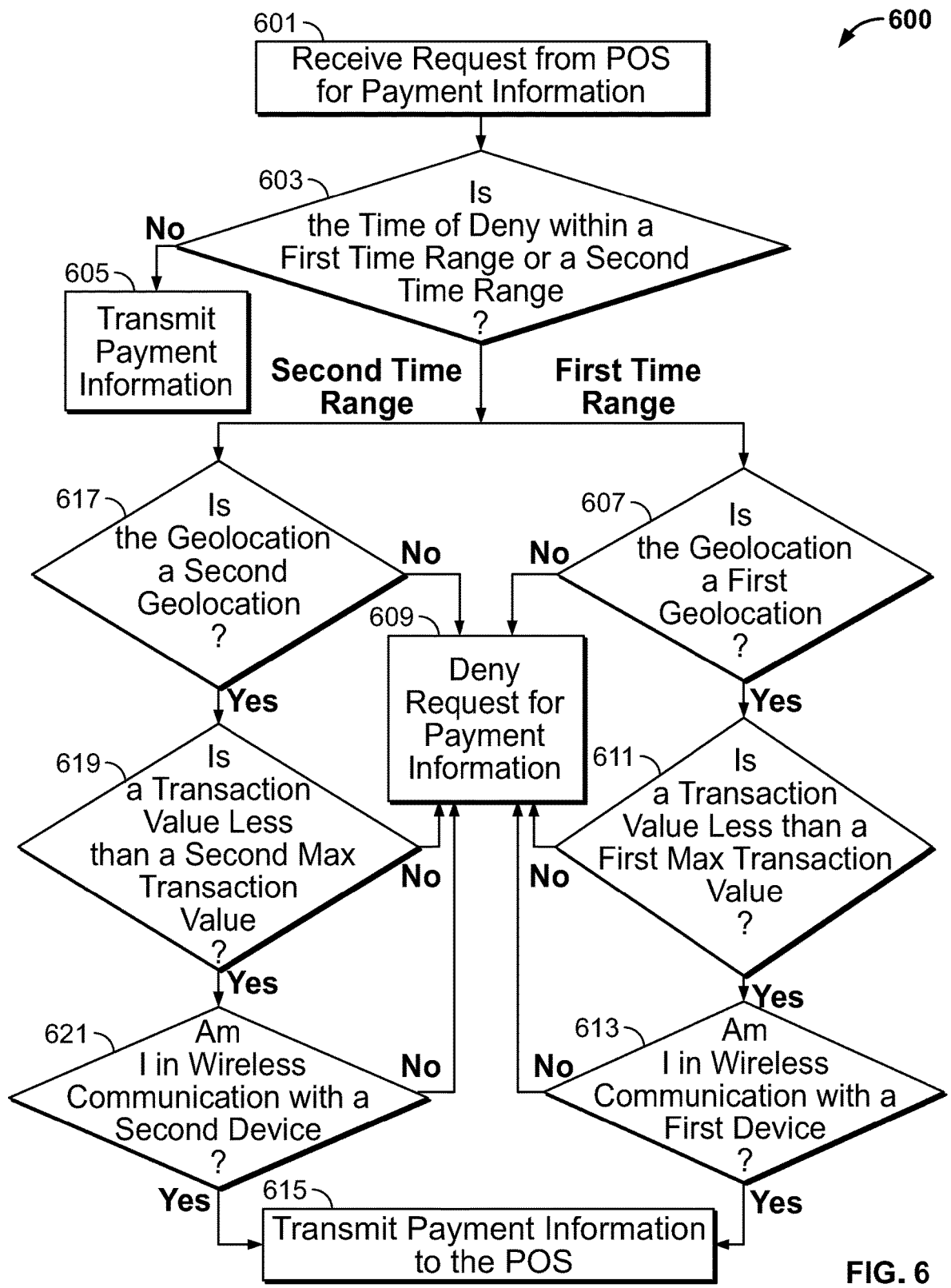
FIG. 6 shows an exemplary method in accordance with the invention.

FIG. 6 shows exemplary method 600 that may be performed in accordance with the invention. Method 600 may be performed by a payment instrument. The payment instrument may be a credit card or a mobile phone that stores credit card information. Method 600 may include some or all of the method steps 601-621. Method 600 may include additional method steps not described in FIG. 6 but disclosed herein.

At step 601 the payment instrument may receive a request from a POS for payment information. At step 603 the payment instrument may determine if the time of day is within a first time range or a second time range. If the time of day is neither in the first or second time range, the method may include, at step 605, transmitting payment information. The payment information may be transmitted to the POS.

If the time of day is determined to be in the first time range, the payment instrument, at step 607, may determine if a geolocation of the payment instrument is a first geolocation. If the geolocation is not the first geolocation, the payment instrument may deny the request for payment information at step 609.

If the geolocation is the first geolocation, the payment instrument may determine if a transaction value is less than a first maximum transaction value at step 611. The transaction value may be the purchase amount. The transaction value may be included in the request from the POS. If the transaction value is not less than the first maximum transaction value, the payment instrument may deny the request for payment information at step 609. If the transaction value is less than the first maximum transaction value, the payment instrument may determine if the payment instrument is in communication with a first device at step 613. If the payment instrument is not in communication with the first device, the payment instrument may deny the request for payment information at step 609. If the payment instrument is in communication with the first device, the payment instrument may transmit payment information to the POS at step 615. The communication may be wireless communication.

If the time of day is determined to be in the second time range, the payment instrument, at step 617, may determine if a geolocation of the payment instrument is a second geolocation. If the geolocation is not the second geolocation, the payment instrument may deny the request for payment information at step 609.

If the geolocation is the second geolocation, the payment instrument may determine if a transaction value is less than a second maximum transaction value at step 619. The transaction value may be included in the request from the POS. If the transaction value is not less than the second maximum transaction value, the payment instrument may deny the request for payment information at step 609. If the transaction value is less than the second maximum transaction value, the payment instrument may determine if the payment instrument is in communication with a second device at step 621. The communication may be wireless communication. If the payment instrument is not in communication with the second device, the payment instrument may deny the request for payment information at step 609. If the payment instrument is in communication with the second device, the payment instrument may transmit payment information to the POS at step 615.

Thus, systems and methods for providing enhanced authentication methods for credit card transactions have been provided. Persons skilled in the art will appreciate that the present invention can be practiced by other than the described embodiments, which are presented for purposes of illustration rather than of limitation.

What is claimed is:

1. A computer-implemented method for approving a credit card transaction at a Point of Sale device ("POS") without sending payment information to an acquiring bank for approval of the transaction, the POS not supporting an internet or telephone line connection at a time of approving the transaction, the method being performed by a Point of Sale device ("POS") and a mobile phone, the method comprising:

the POS performing the method steps of:
receiving credit card information from a customer, the credit card information being provided by the customer to the POS to complete a transaction for a purchase amount;
determining that the POS does not support an internet connection or a telephone line connection;
generating a wireless communications request to connect to a mobile phone using Near-Field Communications ("NFC") protocol;
receiving an NFC communication from the mobile phone including a data packet, the data packet identifying at least a portion of the credit card information;
determining that the data packet correctly identifies the at least a portion of the credit card information; and
wirelessly transmitting to the mobile phone, using NFC protocol, a purchase amount for approval by the mobile phone;

the mobile phone, when the mobile phone does not support internet connection, performing the method steps of:
calculating a lapse of time from which the mobile phone lost internet connection until receipt of the wireless communications request from the POS;
determining if the lapse of time is greater than a threshold lapse of time;
if the lapse of time is greater than the threshold lapse of time, wirelessly transmitting a message to the POS, using NFC protocol, to deny the transaction;
if the lapse of time is less than the threshold lapse of time, proceeding to access stored credit card information, the stored credit card information being associated with a credit card and including an available credit, and determining if the purchase amount is less than a predetermined percentage of the available credit; and
in response to determining that the purchase amount is less than the predetermined percentage of the available credit, wirelessly transmitting to the POS, using NFC protocol, an instruction to approve the transaction;

the POS performing the method steps of approving the transaction when the POS does not support the internet connection or the telephone line connection; and the mobile phone performing the method steps of:
storing the credit card information, the purchase amount, and merchant information that identifies a merchant that supports the POS; and
upon a determination that internet connection has been reestablished on the mobile phone, transmitting, using the internet connection, the stored credit card information, purchase amount and merchant information to a bank for processing.

2. The method of claim 1 wherein the credit card information is transmitted to an acquiring bank of the merchant.

3. The method of claim 1 wherein the credit card information is transmitted to an issuing bank, the issuing bank being a bank that issued the credit card.

4. The method of claim 3 further comprising the mobile phone performing the method step of transmitting to the issuing bank an instruction to transfer to the merchant's acquiring bank the purchase amount less a credit card network processing fee.

\* \* \* \* \*